United States Patent
Ashwood-Smith

(10) Patent No.: US 11,256,676 B2
(45) Date of Patent: Feb. 22, 2022

(54) METHOD AND APPARATUS FOR STORING AND RETRIEVING INFORMATION IN A DISTRIBUTED DATABASE

(71) Applicant: Peter Ashwood-Smith, Gatineau (CA)

(72) Inventor: Peter Ashwood-Smith, Gatineau (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 866 days.

(21) Appl. No.: 15/794,867

(22) Filed: Oct. 26, 2017

(65) Prior Publication Data

US 2019/0129983 A1 May 2, 2019

(51) Int. Cl.
*G06F 16/22* (2019.01)

(52) U.S. Cl.
CPC .............. *G06F 16/2264* (2019.01)

(58) Field of Classification Search
None
See application file for complete search history.

(56) References Cited

U.S. PATENT DOCUMENTS

| | | | |
|---|---|---|---|
| 2010/0223240 A1 | 9/2010 | Cooper | |
| 2012/0290582 A1* | 11/2012 | Oikarinen | G06F 16/21 707/741 |
| 2016/0239529 A1 | 8/2016 | Bulkowski et al. | |
| 2017/0077950 A1* | 3/2017 | Pavlov | H03M 13/611 |
| 2017/0185625 A1* | 6/2017 | Cheru | G06F 16/217 |

FOREIGN PATENT DOCUMENTS

| | | |
|---|---|---|
| CN | 102375853 A | 3/2012 |
| CN | 106202416 A | 12/2016 |

OTHER PUBLICATIONS en.wikipedia.org/wiki/Chord_(peer-to-peer), Aug. 5, 2017.

* cited by examiner

*Primary Examiner* — Aleksandr Kerzhner
*Assistant Examiner* — Eddy Cheung

(57) ABSTRACT

A method and apparatus for interacting with a distributed database is provided. The database includes plural storage devices. Plural keys are generated and associated with a data item. Plural operations, such as storage or retrieval operations are then initiated on the distributed database. Each operation specifies a different key acting as an index for a corresponding data record. The keys can be generated using functions operating on an initial descriptor. For example, the characters of the descriptor can be reordered to produce new keys. As such, a data item can be stored in multiple different storage devices to provide redundancy.

20 Claims, 8 Drawing Sheets

METHOD AND APPARATUS FOR STORING AND RETRIEVING INFORMATION IN A DISTRIBUTED DATABASE

FIELD OF THE INVENTION

The present invention pertains to the field of data storage and retrieval from databases, and in particular to a method and apparatus for storing and retrieving information in a distributed database.

BACKGROUND

Distributed databases can be used to store large amounts of information using multiple separate storage devices, which are typically computers or electronic memory devices with an associated computer processor and communication interface. The storage devices can be networked together and can cooperatively respond to commands to store or retrieve information. The use of multiple devices can allow for improved responsiveness to large numbers of data storage and retrieval requests.

Examples of distributed databases include distributed hash tables, which use a hash function to generate lookup keys from data. However, it is not always ideal to use a hash function to generate keys.

Distributed databases are subject to data loss or delays due to storage devices failures, and outages in communication links connecting to the storage devices. In a large database, the response time for a given database query can be slow and subject to improvement.

For the user of an existing database, there is often no mechanism to protect against failure in the nodes of a database (also referred to as individual storage resources in a distributed database system) provided by a third party provider. If a client wants to enable redundant storage, the client is often forced to rely upon the database provider, or to undertake a complex process if the desire is to force the database to ensure that the redundant entries are stored in a different storage resource than the first entry.

Therefore there is a need for a method and apparatus for storing and retrieving information in a distributed database that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for storing and retrieving information in a distributed database.

In accordance with embodiments of the present invention, there is provided a method for interacting with a distributed database, the distributed database comprising a plurality of data storage devices. The method is performed by an electronic device having a processor, a network interface and a memory. The method includes generating, using the processor, a plurality of keys associated with a data item. The method further includes initiating, using the network interface, a plurality of operations in the distributed database. The operations can be data storage or data retrieval operations. Each of the plurality of operations specifies a different respective one of the plurality of keys. Each one of the plurality of keys acts as an index for a corresponding data record in the distributed database.

In accordance with embodiments of the present invention, there is provided an apparatus for interacting with a distributed database. The distributed database includes a plurality of data storage devices. The apparatus includes a processor, a network interface and a memory. The apparatus is configured to generate, using the processor, a plurality of keys associated with a data item. The apparatus may include a key generator configured for this purpose. The apparatus is further configured to initiate, using the network interface, a plurality of operations in the distributed database. The operations can be data storage or data retrieval operations. Each of the plurality of operations specifies a different respective one of the plurality of keys. Each one of the plurality of keys acts as an index for a corresponding data record in the distributed database. The apparatus may include a database interface configured for this purpose.

In some embodiments, different ones the data storage devices are configured to store data records corresponding to different ranges of key values. In this case, embodiments of the present invention further comprise configuring different ones of the plurality of keys to fall within different ranges of key values corresponding to different data storage devices. Different ones of the plurality of operations can initially be transmitted to different data storage devices, which either handle the instruction or forward it on to another data storage device.

In some embodiments, generating the plurality of keys comprises receiving a first key associated with the data item; and generating a second key by processing the first key in a predetermined injective manner. The injective manner is such that different first keys produce different second keys. This process can be repeated to generate multiple keys. The first key may be an unhashed key, such as a part of the data item or a descriptor for the data item. The first key may be processed using one or more functions, and the functions may be selected based on properties of the first key.

In accordance with embodiments of the present invention, there is provided a method and apparatus for interacting with a distributed database, as described above, except that key generation is potentially performed prior to operation of the method and apparatus, for example by another apparatus or by the same apparatus at a prior time. The method comprises initiating (and the apparatus is configured to initiate) using the network interface, a plurality of operations in the distributed database. Each of the plurality of operations specifies a different respective one of a plurality of keys associated with a data item, and each one of the plurality of keys acts as an index for a corresponding data record in the distributed database. In some embodiments, the plurality of keys are previously generated and stored in memory, for example in a lookup table format. In this case, the method further includes obtaining (and the apparatus is further configured to obtain) the plurality of keys using the processor in cooperation with one or both of the memory and the network interface. The obtained keys can then be used for example for retrieval of previously stored data.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
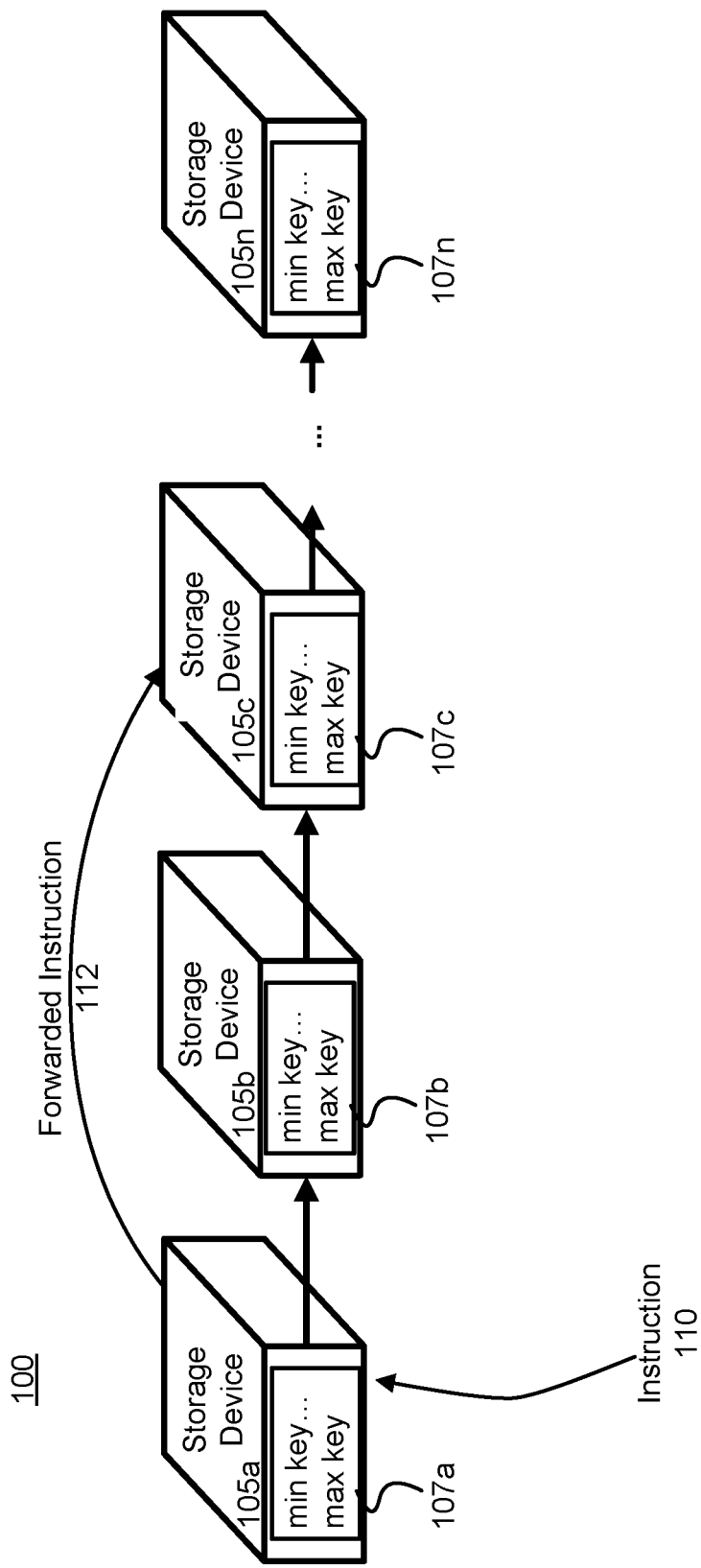
FIG. 1 illustrates a distributed database involved in embodiments of the present invention.

Embodiments of the present invention provide for a method and apparatus for storing and retrieving information in a distributed database, in which a given data item is stored in multiple different data records of the database.

In a distributed database, a plurality of storage resources are employed. The plurality of storage resources may appear as a set of database nodes which each store a portion of the overall distributed database. One effect of using a plurality of database nodes is that one centralized point of failure can be avoided, while another effect is that an increased throughput may be realized by allowing different queries to be handled at different nodes at the same time. In some distributed architectures, database records (also referred to as data items) can be ordered (sorted) on the basis of their keys. Thus, the value of a key determines which of the storage resources or database nodes within the distributed database will hold the corresponding database record/data item.

Creating redundant data items/database records in such a system can either be a function left to the database, or it can be a function of the client used to add and retrieve records. For a client to force redundant storage upon the data requires the client to create redundant data items. If the keys for each of these records are the same, and the key is used to determine where in the distributed system the record is stored, then simply duplicating the data item will not give protection from the failure of a given storage resource, because the redundant records will be stored on the same storage resource.

To address this, a client can force redundant storage of database records/items by ensuring the generation of a record includes defining the key associated with the record in a manner that creates or ensures sufficient space between the key of the duplicate record and the key of the first record. In discussing space between keys, it should be understood that if there is a defined space in which the keys exist, and the keys are mapped to different storage resources, a spacing metric can be defined by how or where keys would be stored. Space between two keys may correspond, for example, to the amount of difference between the storage locations of the two keys. The difference can be a difference in storage memory location, storage resource identity, or both. The space may be a result of the database storing the keys based on a sorting rule, such as storing keys in a first range within a first range of memory addresses and/or within a first storage resource, storing keys in a second range within a second range of memory addresses and/or within a second storage resource, etc.

A data item can refer to a value portion of a (key, value) pair stored in the database. Each of the multiple data records includes a different key (or index) which is usable for data record retrieval. Each of the multiple data records further includes a copy of the data item being stored. As such, the data item can be retrieved by performing a data retrieval operation (also referred to as a database query or simply a query) specifying any one or more of the different keys associated with the data item. The data item is therefore essentially stored multiple times in the database, thereby providing redundancy. Data retrieval can include performing a single query or by performing multiple queries specifying different keys, either sequentially or concurrently.

Although different copies of the data item will generally contain substantially the same content, in some embodiments the content can be encoded differently in different data records. As such, in some embodiments, various channel coding strategies can be employed for facilitating error detection, error correction, or both, by combining multiple copies of the data item upon retrieval. It is noted that repetition coding can also be employed, in which each copy of the data item is stored in the same form (either unencoded or encoded).

The different keys can be created such that the corresponding data records tend to be stored in different storage devices of the distributed database, thereby providing for data redundancy. In some scenarios, the different storage devices of a distributed database are configured to store data records corresponding to different ranges or sets of keys. Therefore, in various embodiments of the present invention, the different keys are generated so that they tend to belong to different ranges or sets of keys, thereby causing the different data records to be stored in different storage devices. For example, a first one of a plurality of keys may be configured to fall within a first range of key values corresponding to a first one of the plurality of data storage devices, and a second one of the plurality of keys may be configured to fall within a second range of key values corresponding to a second one of the plurality of data storage devices. That is, different keys can be configured to fall within different ranges of key values corresponding to different data storage devices. To cause this, appropriate functions for generating the different keys can be selected, for example based on properties of the input first key, properties of the database, etc. Functions can be selected in a reproducible manner so that the same keys are generated during storage and retrieval. Functions can be selected in order to mitigate collisions when storing or retrieving different data items, or in order to avoid generation of duplicate keys for the same data item, or a combination thereof.

In various embodiments, the different keys associated with a given data item are generated by processing a first key (associated with the given data item) in a particular manner. The first key may be a part of the data item or a descriptor for the data item, for example. For example, a function may be defined which receives the first key as input and generates one or more additional keys as output. In various embodiments, the function is injective (one-to-one), meaning that different input values produce different output values. In various embodiments, the function is invertible, and an inverse function may also defined which, when provided with a key output by the function (possibly along with additional information, see below), provides the first key as output. The function (and possibly inverse function) may be implemented using computerized data processing routines, lookup tables, etc. The function (and possibly inverse) function may be provided using software, computer processor, electronic components, or combinations thereof. It is not always necessary for the inverse function to be known or used. Rather, the injective property of the function may be sufficient.

The first key can be used as a key for one of the database's data records storing the data item. Alternatively, the first key can be used to generate multiple other keys, and the other keys, but not the first key, can be used as keys for different respective database data records storing copies of the data item. The function generates at least a second key, of the plurality of keys, by processing the first key in a predetermined injective manner. An injective manner indicates that different additional keys are generated as output by processing different first keys. The injective manner can be a reversible manner, meaning that, given a key generated as output of the processing, the input key can be uniquely determined. The plurality of keys may include at least three keys, generated based directly or indirectly on the first key (or matching the first key, in the case that the plurality of keys includes the first key).

It is noted that, in some cases, when multiple functions are used to generate multiple additional keys, each function may be injective, however different functions can potentially map certain different inputs to the same output. For example, a first function $f1$ may reverse the order of characters of an input key, and a second function $f2$ may swap the first two characters of the input key and then reverse the order of characters of the result. As such, $f1(abcd)=f2(bacd)=dcba$. This can be accepted in some embodiments; however this may result in collisions and possible undesired overwriting of data records. To mitigate this, a unique indication of the function can be included as part of the function's own output. Alternatively, a unique indication of the input key can be included as part of the function's output. For example, the first function $f1$ can be defined as above, with the additional property that the value 1 is appended to the output, and the second function $f2$ can be defined as above, with the additional property that the value 2 is appended to the output. In this case, $f1(abcd)=dcba1$ and $f2(bacd)=dcba2$, which are different. By such an approach, sets of functions can be made to be injective, meaning that different input keys map to different output keys, regardless of which functions of the set are applied. The purpose of such infectivity is to generate additional keys in such a manner that different first keys map, or tend to map, to different, preferably non-overlapping sets of additional keys. This mitigates the potential for database collisions, in which the same additional key is used for storing two different data items.

In other words, consider two different functions $f1$ and $f2$ which map two different input keys x and y to the same output key z (i.e. $f1(x)=f2(y)=z$). This is undesirable because it is not clear whether the data record corresponding to key z is the same as the data record corresponding to key x or key y. However, the ambiguity can be resolved by appending a unique value to the output key. For example, instead of using $f1$ and $f2$, $f1'$ and $f2'$ can be used, where $f1$ is equal to $f1$ but with a value of "1" appended to the output, and $f2$ is equal to $f2$ but with a value of "2" appended to the output. Thus, $f1'(x)=(z,1)$ and $f2'(y)=(z,2)$.

As another example, the input (or a unique portion thereof) can be appended to the output, so that $f1'(x)=(z,x)$ and $f2'(y)=(z,y)$.

In some embodiments, the function may generate a single key. Multiple different functions may then be provided for outputting multiple keys. In other embodiments, the function may generate multiple keys. A parameter may be input to the function to indicate the number of different keys to generate. As mentioned above, a function may output a key along with an indication of how the key was generated (e.g. which function or parameters were used to generate the key). This indication may be encoded into the output key, for example as an identifier integrated into (e.g. appended or prepended to) the key. Alternatively, and in some embodiments, the indication may be provided as a separate value that can be integrated into the data record associated with the key and stored in the database. This indication can be used to facilitate the uniqueness of key values.

In some embodiments, a function is provided which generates an additional key by reversing the characters contained in the provided input (e.g. first) key. The characters may be bits, groups of bits, numeric values, alphanumeric characters, etc. In this case the inverse function is substantially equal to the function itself. In some embodiments, a function is provided which generates an additional key by reordering (re-arranging, e.g. shuffling or permuting) the characters contained in the input key in a defined manner, according to a predetermined reordering rule. In some embodiments, a function is provided which generates an additional key by changing one or more characters of the input key to other characters. That is, each character can be uniquely associated with another character, and the additional key can be generated by replacing characters of the input key with their associated characters. For example, for numerical keys, a predetermined or predictable value can be added to each character. A variety of other types of functions can be defined and used, as would be readily understood by a person skilled in the art. Furthermore, a function can include a sequence of the mapping operations such as described above.

In some embodiments, a function or a plurality of functions for generating additional keys can be selected based on properties of the first key. The properties of the first key can be determined by preliminary analysis or processing of the first key. For example, if the first key includes at least a predetermined number of repeated values, a function that only reorders characters can be avoided. Instead, for example, a function which maps characters to other characters (possibly followed by character reordering) can be used. This mitigates the potential for the function to output the same key as was input. In the case of functions producing multiple keys, this mitigates the potential for the function to output multiple identical keys. Selection of functions can be performed in a predictable and repeatable manner, so that the same functions tend to be selected during a database data storage operation and a data retrieval operation. The function(s) can be selected so that the generated additional keys tend to belong to different ranges of key values corresponding to data records stored by different data storage devices of the distributed database.

The first key may be provided as input, for example as an index or descriptor for the data item. In some embodiments, the first key is a name, username, email address, phone number, or other identifier of an individual. The data item may include information usable for reaching the individual, such as an IP address associated with their mobile device, other messaging identifier, etc. The data item may be updated due to mobility of the user or changes made to registered applications. Thus, the database may be used to provide user contact information, given a key which identifies the user.

In some embodiments, the present invention is used in association with distributed databases in which the keys are not hashed, e.g. distributed databases other than distributed hash tables. This can avoid requirements and problems that are particular to distributed hash tables and hash functions. Additionally, such databases allow for organization of information by key value, such that data items with similar key values tend to be stored together. When the key values are descriptive of the data items, this results in similar data items being stored together. An example of such a distributed database is described briefly below.

FIG. 1 illustrates the example distributed database 100. The database includes multiple storage devices 105a to 105n. An ordering is defined for the keys of data items stored in the database. For example, if the keys are numerical, the ordering can be numerical order. If the keys are alphabetical, the ordering can be alphabetical order. An alphanumeric order can be used for alphanumeric keys. The storage devices are ordered in the sense that device 105a tends to store data items associated with keys that are smaller (in terms of the ordering) than keys stored by other devices 105b to 105n. Similarly, device 105b tends to store data items associated with keys that are smaller than keys stored by other devices 105c to 105n higher in the device order, etc. Each device 105a to 105n is therefore associated with a respective range of key values 107a to 107n, where the ranges are adjacent to (e.g. contiguous with) each other and substantially non-overlapping. As such, different storage devices are configured to store data records corresponding to different ranges of key values.

For further clarity, the devices 105a to 105n are ordered so that, for a pair of adjacent devices (e.g. 105b and 105c), the device on the left (e.g. 105b) is the predecessor device, and the device on the right (e.g. 105c) is the successor device. According to this definition, data records stored in a predecessor device correspond to a first range of keys, and data records stored in a successor device correspond to a second range of keys, where key values in the first range are generally lower than key values in the second range. As an example, the first (numerical) range can be from N to N+M and the second range can be from N+M+1 to N+2M. When one of the devices holds a significantly greater number of data records than its predecessor or successor device, it can perform a balancing operation in which some of its data records (e.g. corresponding to keys at the low end or high end of the device's range) are passed to the predecessor or successor device for storage. The key ranges can be adjusted as part of such balancing.

The ordering of devices can be used to facilitate responses to instructions (such as database queries) for example as follows. When a device (e.g. 105a) receives an instruction 110, it can determine whether the key carried in the instruction belongs to the range of keys stored by the device by comparing the key value with the maximum and minimum values of the device's current range. When the key value is outside of the device's range, the device can forward 112 the instruction to another device (e.g. 105c) which is more likely to hold the data record being queried. The other device can be higher in the device ordering if the key value is higher than maximum of the device's range, or lower in the device ordering if the key value is lower than the minimum of the device's range. The number of devices (in the defined ordering) lying between the device forwarding the instruction and the other device to which the instruction is forwarded can be an increasing function of the absolute value of the difference between the key value and a value lying within or at the edge of the device's (i.e. the device forwarding the instruction) range. When the forwarding operation is repeated, the successive forwarding operations can be configured so that this number of intermediate devices can generally decrease.

More generally, data storage devices in receipt of an instruction can be configured to respond to the instruction when the data record being queried is held by the device, and to forward the instruction to another data storage device when the data record being queried is not held by the device. Similarly, data storage devices in receipt of an instruction to store a data record can be configured to store the data record when the key value for the data record is within a range accommodated by the device, and to forward the data record to another data storage device for consideration when the key value for the data record is not within a range accommodated by the device. This behaviour is collectively referred to herein as operation forwarding, and distributed databases having data storage devices exhibiting such behaviour are referred to as operation forwarding distributed databases. Operation forwarding can include performing referrals, in which a given data storage device forwards a request or command to a different data storage device for handling or further forwarding.

In accordance with embodiments of the present invention, multiple instructions (e.g. queries) can be submitted to an operation forwarding database, such that each instruction is submitted to a different data storage devices of the operation forwarding database. This can increase the instruction response speed and reduce the chance of failure due to device or network outages. In further embodiments, each of the multiple instructions can specify a different one of a plurality of keys associated with the data item to be retrieved. The plurality of keys are generated as described elsewhere herein.

As such, embodiments of the present invention can include initiating a plurality of data retrieval operations (queries) in the distributed database, where each of the plurality of data retrieval operations specifies a different respective one of a plurality of keys. The plurality of keys can be generated based on a first key. The data retrieval operations can include querying the distributed database for a copy of the data item paired with each different one of the plurality of keys.

The ordering of devices can also be used to support queries for records corresponding to a range of key values. When data records corresponding to a continuous range of key values is stored in a single storage device, responding to a query for data records corresponding to part or all of this range can be simplified. This is because the single storage device can respond by providing multiple data records in an organized form, rather than searching for and retrieving different data records from different storage devices.

Further details on an appropriate distributed database can be found in U.S. patent application Ser. No. 15/633,340, filed on Jun. 26, 2017 and entitled "Self-Balancing Binary Search Capable Distributed Database".

In some embodiments, the present invention is used in association with distributed databases in which the keys are hashed, e.g. distributed hash tables. In this case, generating the plurality of keys from the first key can include hashing the first key, hashing the generated keys, or both. For example, a function for generating additional keys can be applied to the first key, and the additional key(s) can then be hashed. Alternatively, the first key can be hashed, and the function for generating additional keys can be applied to the hashed first key. In some embodiments, the output of the function can then be hashed again.

Figure 2:
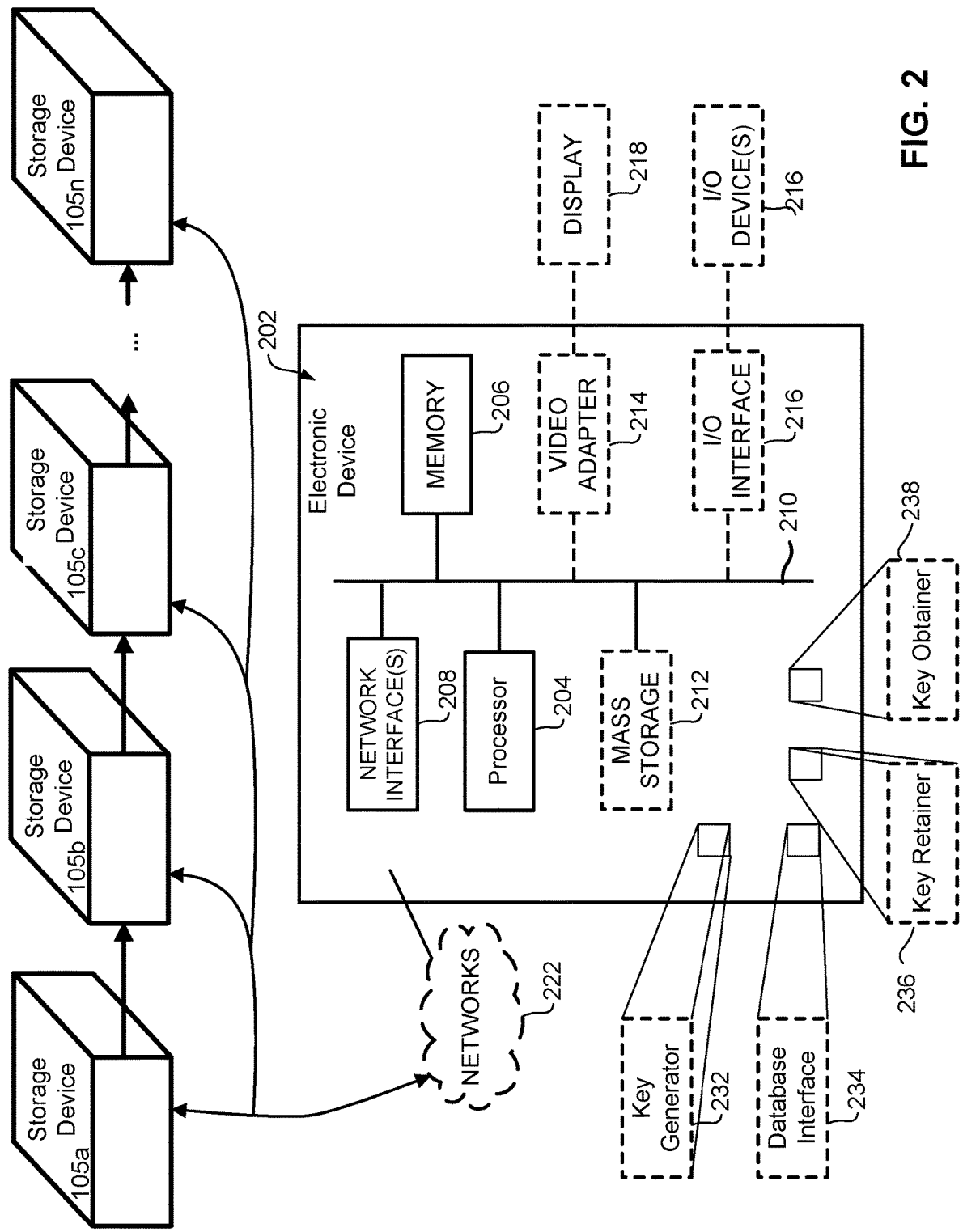
FIG. 2 illustrates an apparatus for interacting with a distributed database, according to embodiments of the present invention.
Figure 3A:
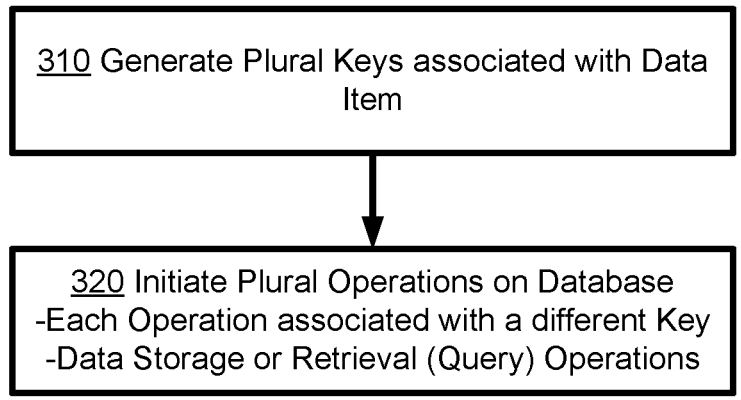
FIG. 3A illustrates operations of an apparatus for interacting with a distributed database, according an embodiment of the present invention.

Having reference now to FIG. 2, embodiments of the present invention provide for an apparatus 202 for interacting with a distributed database. The apparatus is an electronic device. The distributed database includes a plurality of data storage devices 105a to 105n. Each data storage device includes a processor, a memory, and a network interface. The electronic device 202 also includes a processor 204, a memory 206 and a network interface 208. The network interface 208 may be communicatively coupled to the storage devices 105a to 105n via one or more wired or wireless networks 222. Having reference to FIG. 3A, the electronic device is configured to generate 310 a plurality of keys associated with a data item. The electronic device may include a key generator 232 configured to generate the plurality of keys. Additionally or alternatively, the electronic device may include a key retainer 236 which is configured to retain a generated plurality of keys for future use. The key retainer 236 may store the plurality of keys in the memory 206, or transmit the keys to a location external to the electronic device via the network interface 208. The transmission may be performed as part of an operation to store the keys remotely, or upon request by another device to obtain the keys from the electronic device. Additionally or alternatively, the electronic device may include a key obtainer 238 which is configured to obtain a previously generated plurality of keys, for example from the memory 206 or from a location external to the electronic device, via the network interface 208. The key obtainer may transmit a request for the keys and receive the keys in a response to the request. Operation of the key retainer 236 and key obtainer 238 correspond to operation of the processor 204, in cooperation with the memory 206, the network interface 208, or both.

The electronic device is further configured to initiate 320 a plurality of operations in the distributed database. Each operation is associated with a different key, belonging to the generated plurality of keys or an initial first key used in generating the plurality of keys. The electronic device may include a database interface 234 configured to communicate with the database in order to initiate the plurality of operations. The database interface 234 may further be configured to receive and process responses from the database.

The database interface 234 primarily uses the network interface 208 but provides specifically for database interaction, including generating specific instructions and messages according to applicable database protocols. The key generator 232, key retainer 236, key obtainer 238 and the database interface 234 may be provided using the processor 204 executing instructions stored in the memory 206 or mass storage 212 and also using the network interface 208 for communication with devices of the database. Each of the plurality of operations specifies a different respective one of the plurality of keys. Each one of the plurality of keys is a key for a different respective one of a plurality of data records, stored or to be stored in the distributed database. Each data record includes a copy of the data item.

The electronic device 202 may be used for implementing the methods disclosed herein. In some embodiments, the electronic device may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a device that connects to network infrastructure over a radio interface, such as a personal computer, computer server, mobile phone, smart phone or other such device. In some embodiments, an electronic device may be a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, the electronic device may contain multiple instances of a component, such as multiple processors, memories, transmitters, receivers, etc. The processor 204 may be a Central Processing Unit (CPU), and may further include specialized processors such as a Graphics Processing Unit (GPU) or other such processor. The electronic device may include a bus 210 configured to connect the components of the device 202. The electronic device 202 may optionally also include components such as a mass storage device 212, a video adapter 214, and an I/O interface 216 (shown in dashed lines).

The memory 208 may comprise any type of non-transitory system memory, readable by the processor 204, such as static random access memory (SRAM), dynamic random access memory (DRAM), synchronous DRAM (SDRAM), read-only memory (ROM), or a combination thereof. In an embodiment, the memory 208 may include more than one type of memory, such as ROM for use at boot-up, and DRAM for program and data storage for use while executing programs. The bus 210 may be one or more of any type of several bus architectures including a memory bus or memory controller, a peripheral bus, or a video bus.

The network interface(s) 208 may include at least one of a wired network interface and a wireless network interface. The network interface(s) 208 may include a wired network interface to connect to a network 222, and also may include a radio access network interface for connecting to other devices over a radio link. When electronic device 202 is part of a network infrastructure, the radio access network interface may be omitted for nodes or functions acting as elements of the Core Network (CN) other than those at the radio edge (e.g. an eNB). When electronic device 202 is part of the infrastructure at the radio edge of a network, both wired and wireless network interfaces may be included. When electronic device 202 is a wirelessly connected device, such as a User Equipment, a radio access network interface may be present and it may be supplemented by other wireless interfaces such as Wi-Fi network interfaces. The network interfaces 208 allow the electronic device 202 to communicate with remote entities such as those connected to network 222, particularly the storage devices 105a to 105n.

The mass storage 212 may comprise any type of non-transitory storage device configured to store data, programs, and other information and to make the data, programs, and other information accessible via the bus 210. The mass storage 212 may comprise, for example, one or more of a solid state drive, hard disk drive, a magnetic disk drive, or an optical disk drive. In some embodiments, mass storage 212 may be remote to the electronic device 202 and accessible through use of a network interface such as interface 208. In the illustrated embodiment, mass storage 212 is distinct from memory 206 where it is included, and may generally perform storage tasks compatible with higher latency, but may generally provide lesser or no volatility. In some embodiments, mass storage 212 may be integrated with a heterogeneous memory 206.

The optional video adapter 214 and the I/O interface 216 (shown in dashed lines) provide interfaces to couple the electronic device 202 to external input and output devices. Examples of input and output devices include a display 218 coupled to the video adapter 210 and an I/O device 216 such as a touch-screen coupled to the I/O interface 212. Other devices may be coupled to the electronic device 202, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 216 and Video Adapter 214 may be virtualized and provided through network interface 208.

In some embodiments, electronic device 202 may be a standalone device, while in other embodiments electronic device 202 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

The plurality of operations can be data storage operations or data retrieval (query) operations. The apparatus may perform data storage operations for storing a data item in the database, and then subsequently perform data retrieval operations for retrieving the same data item from the database. There may be multiple similar apparatuses 202 communicatively coupled to the database, one of which may initiate the data storage operations and another of which may initiate the data retrieval operations. Furthermore, multiple apparatuses 202 may cooperatively perform data storage or data retrieval operations. The use of multiple apparatuses 202 can allow different client applications (or different instances of a client application) to interact with the database. Some or all of the plurality of operations can be performed sequentially. Some or all of the plurality of operations can be performed concurrently.

Each data storage operation can include storing a copy of a specified data item, paired with a different respective one of the plurality of keys. The keys may be searchable in the database. Each one of the plurality of keys is thus usable for subsequently retrieving the data item from the distributed database. The data item, paired with a key, corresponds to a record in the database.

The operations may be ceased upon satisfaction of a given condition. For example, in some embodiments, once a data retrieval operation has resulted in successful retrieval of a data item, further ones of the plurality of data retrieval operations can be omitted. In other embodiments, multiple copies of the data item can be retrieved using multiple data retrieval operations. To mitigate errors, the data item can be extracted from the preponderance of responses. That is, the data item most often appearing among the responses may be selected and returned as the final retrieved data item. Other error correction schemes based on multiple responses can also be used.

In some embodiments, several different types of queries can be made available. For example, a first type of query can be configured to perform multiple data retrieval operations using different keys, and return the first result. A second type of query can perform multiple data retrieval operations using different keys, compare the results, and return a deemed correct result. A third type of query can perform multiple data retrieval operations using different keys, compare the results, and return an indication of whether all the results are identical, or an indication of inconsistencies.

Figure 3B:
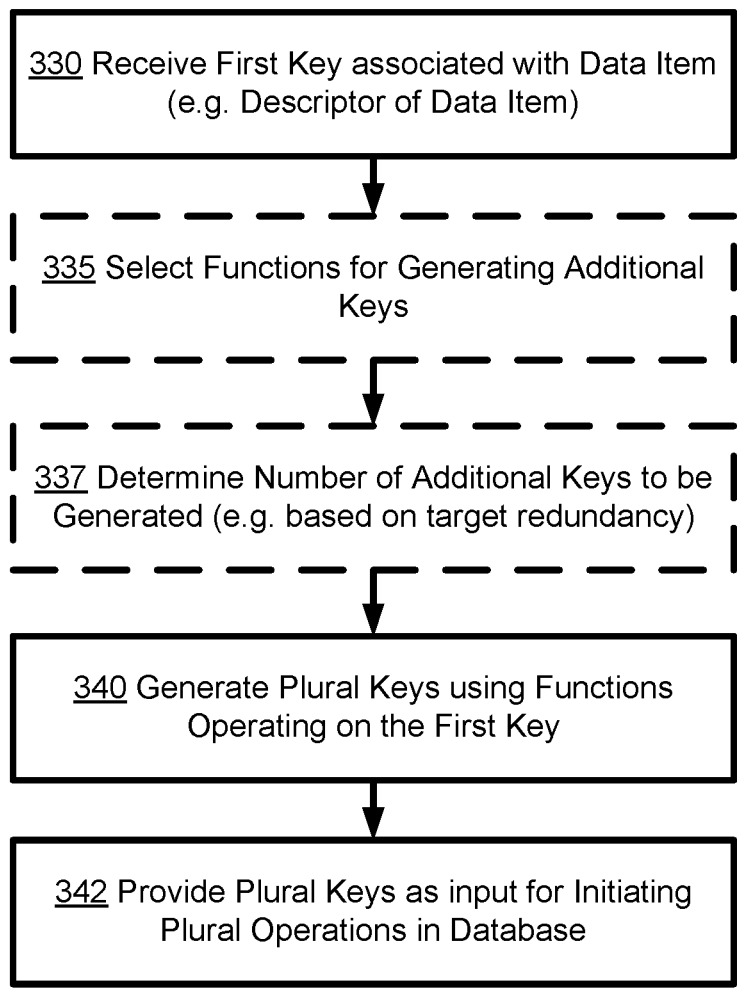
FIG. 3B illustrates key generation operations of an apparatus, according an embodiment of the present invention.

Having reference to FIG. 3B, key generation may be performed as follows. A first key is received 330. The first key may be a descriptor for the data item, for example. Optionally, one or more functions for generating additional keys may be selected 335, for example based on properties of the first key, or based on properties of the distributed database, or a combination thereof. For example, the functions may be selected so that the generated keys tend to be different from one another and tend to fall within different ranges corresponding to different data storage devices of the distributed database. Optionally, the number of keys to be generated can be determined 337 (e.g. selected), for example based on a given or determined target redundancy level. For example, the plurality of keys may consist of N keys, where N is selected based on the target redundancy level. The order of operations 335 and 337 can be interchanged in some embodiments, for example when different functions are used to generate different keys. The plurality of keys can then be generated 340 using the one or more functions, at least one of which is operating on the first key (while others may optionally operate on the output of those at least one functions). In one embodiment, the first key can be provided as input to each of a plurality of functions, each providing one or more of the plurality of keys. In another embodiment, the first key can be provided as input to a first one or more of the plurality of functions, and output of the first one or more functions can be provided as input to further ones of the plurality of functions. The plurality of keys are then provided 342 as input for initiating the plural operations in the database.

The first key may be included as one of the plurality of keys or excluded from the plurality of keys. That is, the first key may optionally be used as a descriptor or initial key generator value only.

Figure 3C:
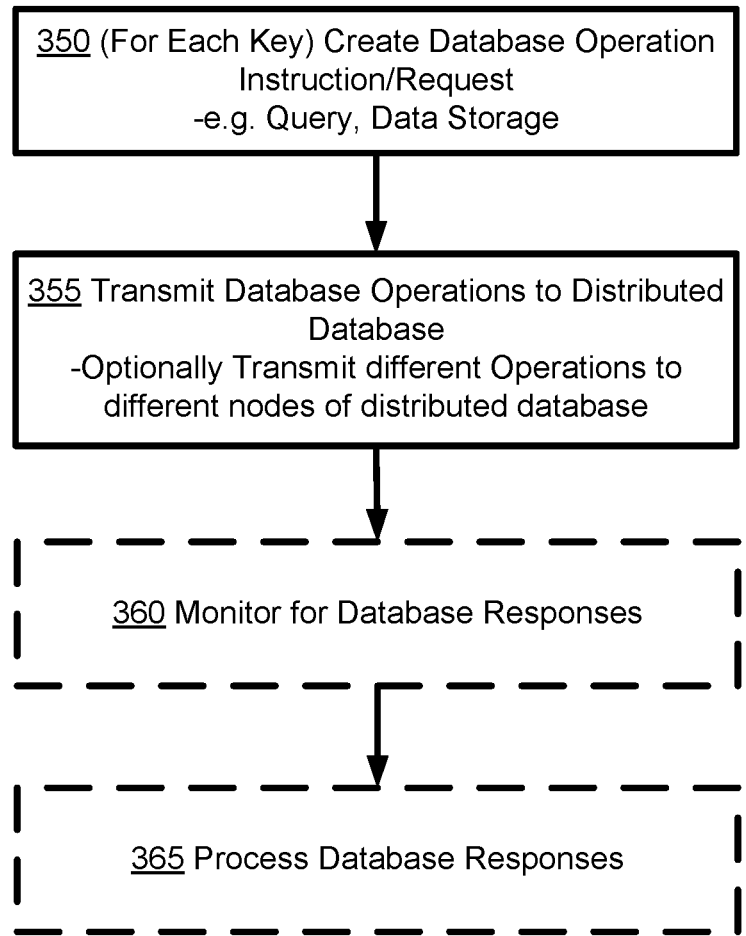
FIG. 3C illustrates database interface operations of an apparatus, according an embodiment of the present invention.

Having reference to FIG. 3C, initiating plural operations in the database may be performed as follows. For each of the provided plurality of keys, a database operation instruction (or request) is created 350. For storing of the data item in plural locations of the database, the database operation instruction can be an instruction to store a copy of the data item in a data record corresponding to a specified key. The storage instruction further includes or specifies the data item to be stored. For retrieving the data item from the database, the database operation can be an instruction to retrieve and provide the contents of a data record corresponding to the specified key. Each of the created database operations can then be transmitted 355 as requests or instructions to the distributed database. In some embodiments, each operation can be transmitted to a (possibly different) specified node or storage device of the distributed database. In some embodiments, when a response from the database is expected, monitoring 360 for database responses generated by the plurality of database operations can be performed. The responses can then be processed 365, for example to identify the correct response to a query.

In various embodiments, for example when interacting with an operation forwarding database, different ones of the plural operations can be initially sent to a different storage device of the distributed database. This can mitigate the possibility of failure due to the operation instruction being transmitted to an inoperative storage device or along an inoperative communication link. This can also increase expected response speed due to the lower possibility of encountering a communication or processing delay, due to path diversity.

Figure 4A:
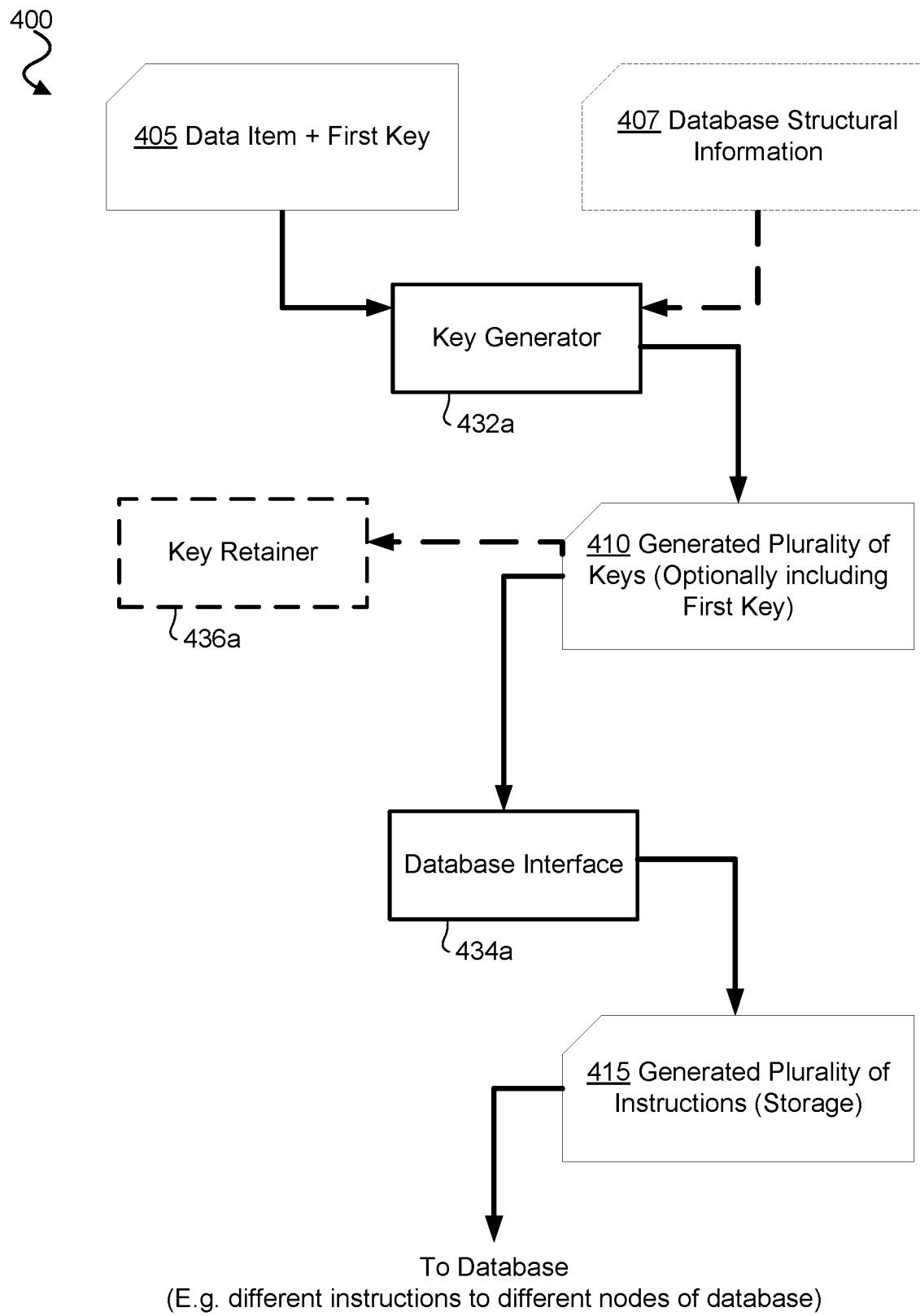
FIG. 4A illustrates a data storage operation according to embodiments of the present invention.

FIG. 4A illustrates an example data storage operation 400, according to an embodiment of the present invention. In the data storage operation 400, a data item and first key 405 are received by the key generator 432a. The first key can be part of or separate from the data item. The key generator 432a then generates a plurality of keys 410 based on the first key. The plurality of keys may also be generated based on further information, such as database structural information. For example, ranges of key values stored by different database storage devices may be received, and the key generator may generate the additional keys so that different additional keys fall within ranges of key values of different database storage devices. In this case, the database structural information 407 is also received by the key generator 432a. The plurality of keys 410 and the data item are then provided to the database interface 434a, which generates a plurality of instructions 415 for handling by the database. Each of the plurality of instructions 415 is an instruction to store a copy of the data item in a database record indexed by a different respective one of the plurality of keys 410. Different instructions can be transmitted to different data storage devices of the distributed database. The database executes the instructions 415.

In some embodiments, the plurality of keys 410 is also provided to a key retainer 436a. The key retainer is configured to store (retain) the keys in local or remote memory, and optionally to provide the keys to another entity upon request. The key retainer 436a may, for example, build a lookup table entry which specifies the plurality of keys and which is indexed by the first key.

It should be noted that, when database structural information is used in key generation, care should be taken to generate keys in a repeatable manner. For example, unchanging database structural information may be used. As another example, changeable database structural information may be used, but additional measures may be taken to ensure the same keys are generated for storage and retrieval of the same data, to mitigate collisions between different data items, or both. For example, the database structural information may be updated periodically with a different version number, and the version number can be appended to the key generator output. It should also be understood that detailed information about the structure of the database does not need to be provided to a key generator. If the objective is to generate keys for the redundant records with sufficient spacing between them, the key generation function can be provided a metric indicative of the required spacing. Thus, if the distributed database adds a storage resource, the spacing between keys can become smaller while still ensuring that the redundant records are stored in different storage resources and the addition of the storage resource can be expressed to the key generation function as a revision to a key spacing metric.

Figure 4B:
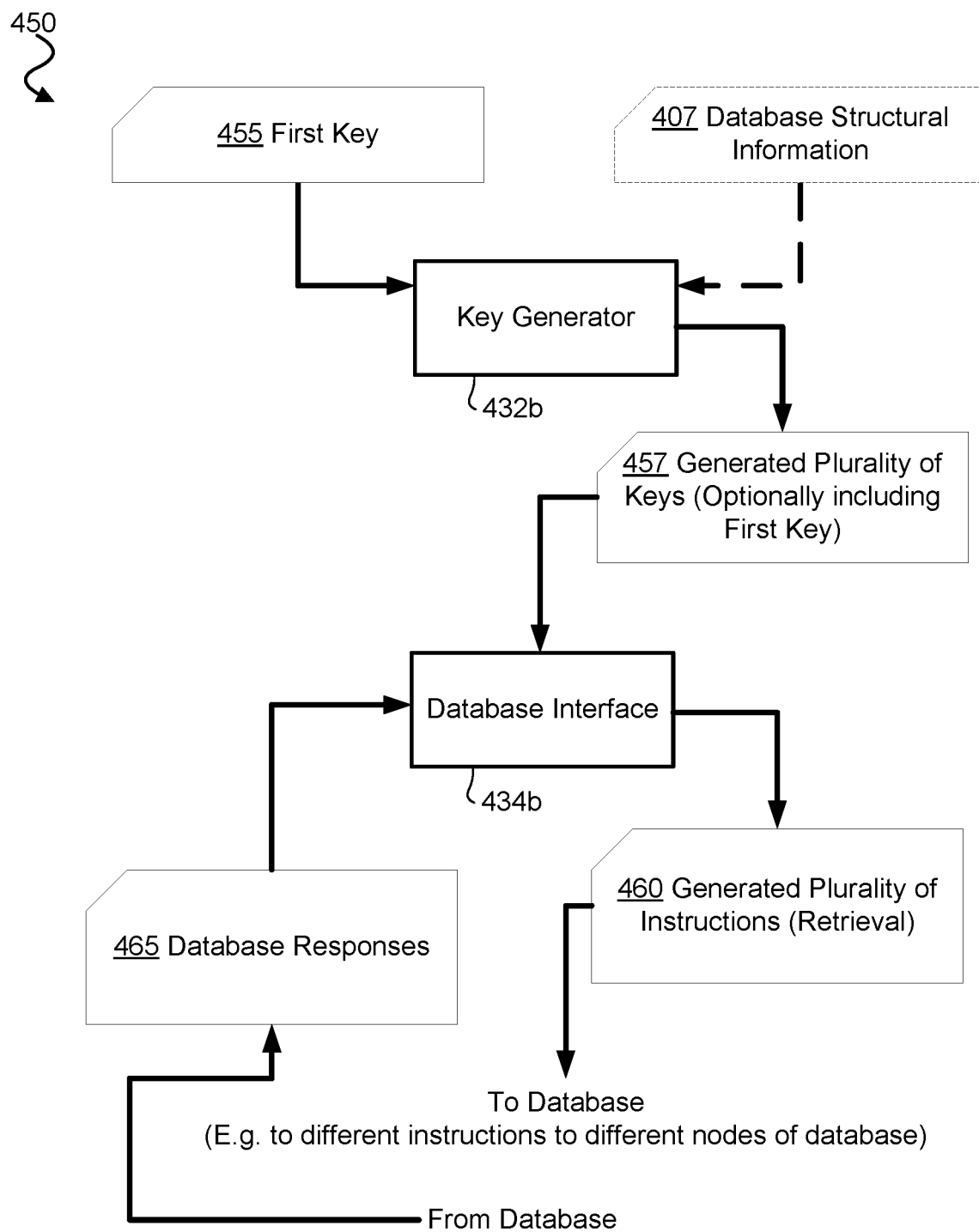
FIG. 4B illustrates a data retrieval operation according to embodiments of the present invention.

FIG. 4B illustrates an example data retrieval (query) operation 450, according to an embodiment of the present invention. The data storage operation 400 and data retrieval operation 450 can be performed by different devices. In the data retrieval operation 450, a first key 455 is received by the key generator 432b. The key generator 432b then generates a plurality of keys 457. The key generator 432b can generate keys in the same manner as the key generator 432a. The key generator may optionally receive and use the same database structural information 407 as was used for the data storage operation 400. When provided with the same first keys, the two key generators 432a and 432b output the same plurality of keys, so that keys 410 match keys 457. In some embodiments, when provided with the same first keys, the key generator 432b outputs a subset of the keys output by the key generator 432a. In some embodiments, when provided with the same first keys, the output of the two key generators 432a and 432b overlaps, at least with high (e.g. >50%) probability. However, it is typically desirable to consistently generate the same additional keys from the same first key, so that consistency between all data records corresponding to the same first key can be maintained.

Because the keys generated during data storage and data retrieval match or at least overlap, the same first key can be used for both data storage and retrieval. Different key generators located at different devices can be configured to produce the same output keys, so that data stored using one device can be retrieved using a different device. Alternatively, the keys generated during data storage can be stored in memory and later retrieved during data retrieval. This causes the keys used during storage and retrieval to match, and avoids duplicating key generation operations.

The plurality of keys 457 are then provided to the database interface 434b, which generates a plurality of instructions 460 for handling by the database. Each of the plurality of instructions 460 is an instruction to retrieve contents of a database record indexed by a different respective one of the plurality of keys 457. Different instructions can be transmitted to different data storage devices of the distributed database. The database executes the instructions 460 and transmits responses 465, which include the contents of the database records. The database interface 420b then processes the responses 465 to identify the data item. For example, the responses 465 can be compared to identify the most frequent data item contained therein. This most frequent data item can be identified and provided as the result of the data retrieval operation 450.

Figure 4C:
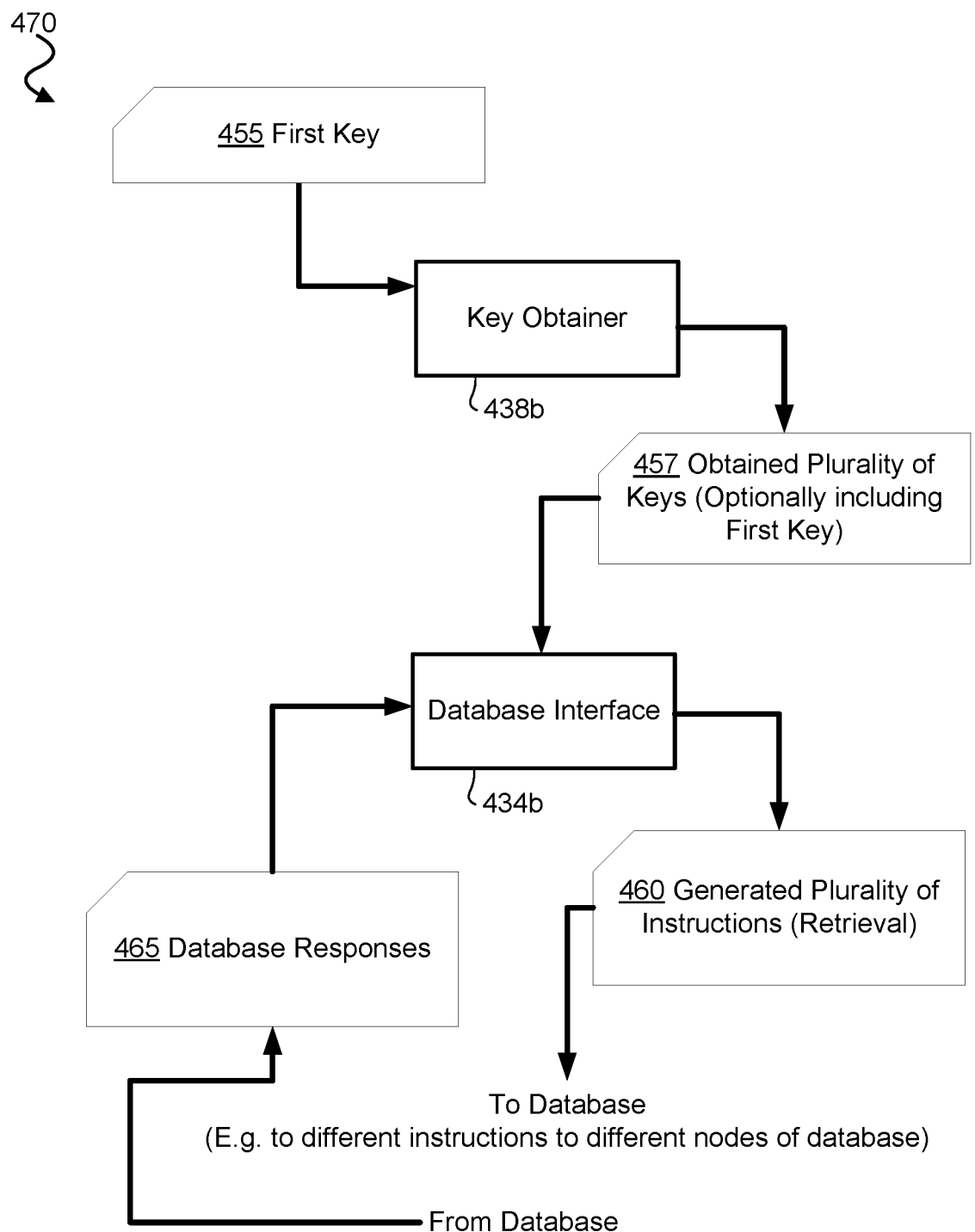
FIG. 4C illustrates a data retrieval operation according to other embodiments of the present invention.

FIG. 4C illustrates an alternative data retrieval operation 470, in which the plurality of keys are obtained from memory (having been previously generated) rather than being generated as part of the operation. However, it should be noted that the operation of FIG. 4B also applies to the case where the keys are generated by the key generator 432b, stored for a period of time, and then subsequently provided to and used by the database interface 434b. According to the data retrieval operation 470, the first key 455 is received by a key obtainer 438b rather than the key generator 432b. The key obtainer 438b then obtains the plurality of keys 457. The plurality of keys 457 are then provided to the database interface 434b, and subsequent operations are performed as already described with respect to FIG. 4B.

In some embodiments, the plurality of keys are stored in a local or remote memory, and the key obtainer 438b obtains the plurality of keys from the memory. Obtaining the keys may be performed for example via a table lookup operation. The plurality of keys can be stored (e.g. by a key retainer) in a table or other memory structure and indexed using the first key. The lookup operation can specify the first key in a query, and the associated plurality of keys can be returned in response to the query. As such, the first key can be used as an index for retrieving the plurality of keys from memory.

Figure 5:
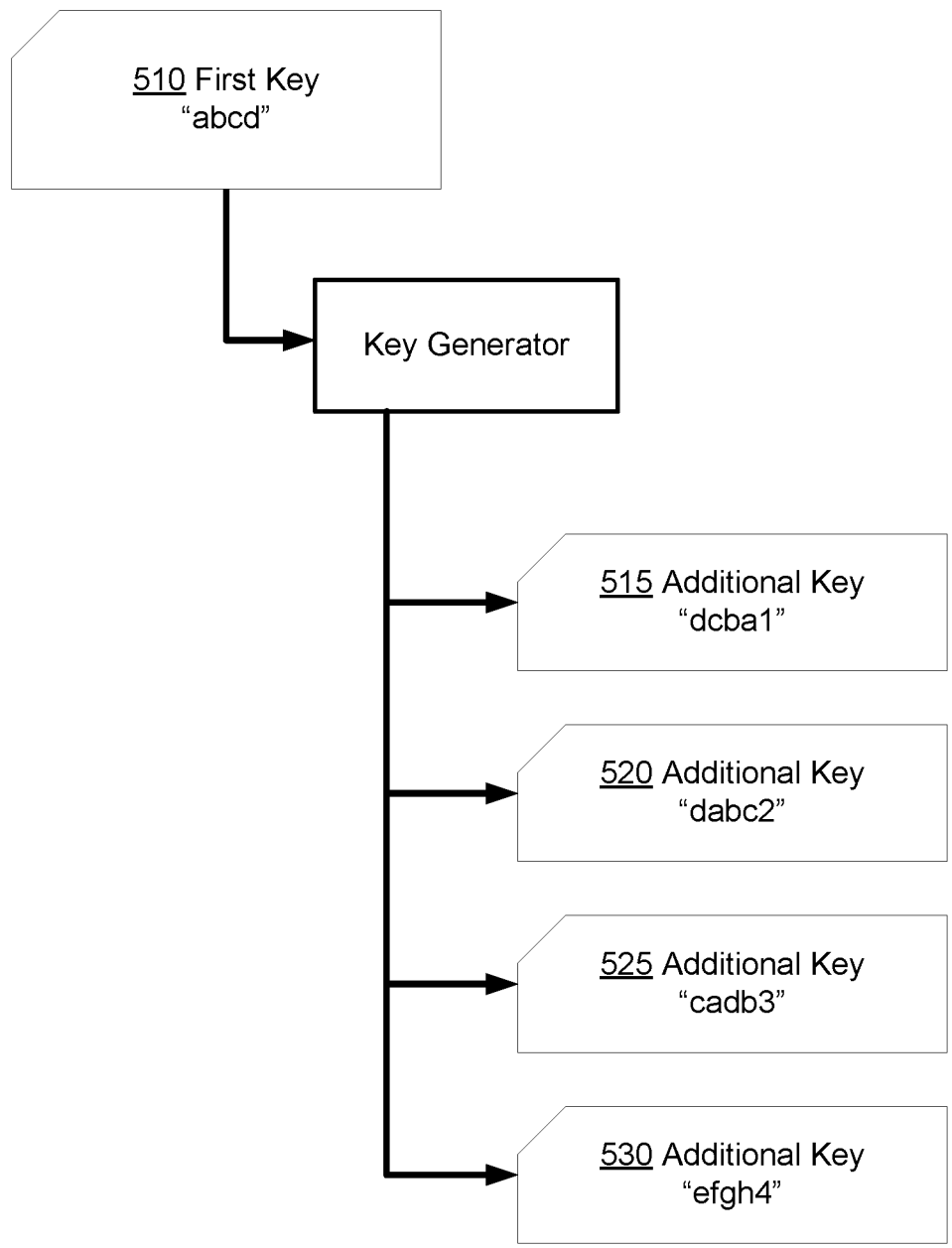
FIG. 5 illustrates example key generation according to embodiments of the present invention.

FIG. 5 illustrates examples of additional keys generated from a first key 510, according to an embodiment of the present invention. For purposes of illustration, the first key 510 includes four characters "abcd" in order. In some embodiments, an additional key 515 includes a reversal "dcba" of the first key 510. In some embodiments, an additional key 520 is generated by cyclically shifting the characters of the first key 510 one position to the right, to obtain "dabc". In some embodiments, an additional key 525 is generated by shuffling the characters of the first key 510 to obtain "cadb". In some embodiments, an additional key 530 is generated by replacing each of the characters of the first key 510 with a character that is five more than the current character in a cyclic alphabetical order, to obtain "efgh". In some embodiments, a sequence of functions or mappings, such as those described above, can be applied one after the other. It should be understood that the above descriptions typically show the reordering of values within a key for the purposes of ease of understanding. The keys associated with redundant records do not need to be the same length as the keys to the first database records/data items. In one such example, the keys associated with original entries may be 10 digits long, with each of the values of the digits being a number. Redundant keys may be longer than 10 digits to ensure that a redundant entry does not collide with the key of another record. Furthermore, if there is more than one redundant entry, there is no need for each of the keys to be same length (nor is there a requirement that they each be a different length). Where a first record may have a key that is a 10 digit numeric value, a first redundant entry may also have a 10 digit key but with all digits being alphabetic values, and a second redundant entry may have a key value that is more than 10 digits, each of the digits being numeric, alphabetic, or alphanumeric as the case may be.

The additional keys 515, 520, 525, 530 may also include an identifier which uniquely or substantially uniquely corresponds to how the additional key was derived. In the present example, the identifier is a numerical value appended at the end of the additional key. In other cases, the identifier can be encoded into the key or implicit in the key, for example due to each key mapping to a different, unique range of possible values. As another example, the original first key, or a unique portion thereof, can be included in the generated additional key, for example appended thereto.

It is noted that a first key having N unique characters can be mapped into N factorial minus one (N!−1) different additional keys by reordering the characters. The minus one accounts for the requirement that the additional keys be different from the first key. One of these additional keys will correspond to the first key written in reverse. Others will correspond to left or right cyclic shifts. When the first key includes repeated characters, some of these additional keys will be identical to the first key and/or other additional keys. In various embodiments, fewer than all N!−1 additional keys are generated, particularly for large values of N. Functions may generate some of these keys via consistently applied rules, such as "swap the first and third characters, and swap the second and fifth characters," etc.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for interacting with a distributed database, the distributed database comprising a plurality of data storage devices, the method comprising, by an electronic device having a processor, a network interface and a memory:
   generating, using the processor and based on a target redundancy level to be applied to a data item, a plurality of keys equal to said redundancy level, said plurality of keys further being generated based directly or indirectly on a first key acting as an index to the data item wherein said generating uses a metric indicative of a spacing between said plurality of keys to: generate said plurality of keys spaced apart by a value representing said metric, and cause different redundant copies of the data item to be stored on different ones of the plurality of data storage devices; and
   initiating, using the network interface, a plurality of operations in the distributed database, each of the plurality of operations specifying a different respective one of the plurality of keys, each one of the plurality of keys acting as an index for a corresponding redundant copy of the data item in the distributed database.

2. The method of claim 1, wherein the plurality of operations include plural data storage operations for the data item, each of the plural data storage operations storing a copy of the data item in a corresponding data record.

3. The method of claim 2, wherein different ones of the plurality of data storage devices are configured to store data records corresponding to different ranges of key values, the method further comprising configuring a first one of the plurality of keys to fall within a first range of key values corresponding to a first one of the plurality of data storage devices and configuring a second one of the plurality of keys to fall within a second range of key values corresponding to a second one of the plurality of data storage devices different from the first one of the plurality of data storage devices.

4. The method of claim 1, wherein the plurality of keys includes the first key and a second key, and wherein generating the plurality of keys comprises:
receiving the first key; and
generating the second key by processing the first key in a predetermined injective manner.

5. The method of claim 4, wherein generating the plurality of keys further comprises:
generating a third key by processing at least one of the first key and the second key in another predetermined injective manner,
wherein the plurality of keys further comprises the third key.

6. The method of claim 1, wherein generating the plurality of keys comprises receiving the first key associated with the data item and processing the first key using one or more functions, the method further comprising selecting the one or more functions based on properties of the first key.

7. The method of claim 6, wherein different ones of the plurality of data storage devices are configured to store data records corresponding to different ranges of key values, and wherein selecting the one or more functions based on properties of the first key comprises selecting functions that cause different ones of the plurality of keys to fall within different ones of said different ranges of key values.

8. The method of claim 1, wherein the plurality of keys includes at least three keys, generated based directly or indirectly on the first key.

9. The method of claim 1, wherein the first key is a descriptor for the data item or a portion of the data item.

10. The method of claim 1, wherein the plurality of operations include plural data retrieval operations for the data item, each of the plural data retrieval operations comprising querying the distributed database for one of said redundant copies of the data item paired with said different respective one of the plurality of keys.

11. The method of claim 10, wherein storage of the plurality of data records comprises generating the plurality of keys in a given manner based on the first key, and wherein performing the plural data retrieval operations comprises repeating generation of the plurality of keys in the same given manner based on the first key.

12. The method of claim 1, wherein each of the plurality of data storage devices are configured to handle a received instruction by either processing the instruction locally or forwarding the instruction to another one of the plurality of data storage devices for processing, and different ones of the plurality of operations are initially transmitted to a different one of the plurality of data storage devices.

13. The method of claim 1, further comprising: receiving plural responses to the plurality of operations; and processing the plural responses together to determine a single indication of the data item.

14. The method of claim 1, further comprising storing the plurality of keys for subsequent use in interacting with the distributed database.

15. An apparatus for interacting with a distributed database, the distributed database comprising a plurality of data storage devices, the apparatus comprising a processor, a network interface and a memory and configured to:
generate, using the processor and based on a target redundancy level to be applied to a data item, a plurality of keys equal to said redundancy level, said plurality of keys further being generated based directly or indirectly on a first key acting as an index to the data item wherein said generating uses a metric indicative of a spacing between said plurality of keys to: generate said plurality of keys spaced apart by a value representing said metric, and cause different redundant copies of the data item to be stored on different ones of the plurality of data storage devices; and
initiate, using the network interface, a plurality of operations in the distributed database, each of the plurality of operations specifying a different respective one of the plurality of keys, each one of the plurality of keys acting as an index for a corresponding redundant copy of the data item in the distributed database.

16. The apparatus of claim 15, wherein generating the plurality of keys comprises receiving the first key and processing the first key using one or more functions, wherein each key of the plurality of keys belongs to a different range of key values.

17. A method for interacting with a distributed database, the distributed database comprising a plurality of data storage devices, the method comprising, by an electronic device having a processor, a network interface and a memory:
initiating, using the network interface, a plurality of operations in the distributed database, each of the plurality of operations specifying a different respective one of a plurality of keys associated with a data item, each one of the plurality of keys acting as an index for a redundant copy of the data item in the distributed database wherein the plurality of keys are generated based directly or indirectly on a first key acting as an index to the data item, the plurality of keys equal to a target redundancy level to be applied to said data item; wherein a metric indicative of a spacing between said plurality of keys is used to: generate said plurality of keys spaced apart by a value representing said metric, and cause different redundant copies of the data item to be stored on different ones of the plurality of data storage devices.

18. The method of claim 17, wherein the plurality of keys are previously generated and stored, the method further comprising obtaining the plurality of keys using the processor in cooperation with one or both of the memory and the network interface.

19. An apparatus for interacting with a distributed database, the distributed database comprising a plurality of data storage devices, the apparatus comprising a processor, a network interface and a memory and configured to:
initiate, using the network interface, a plurality of operations in the distributed database, each of the plurality of operations specifying a different respective one of a plurality of keys associated with a data item, each one of the plurality of keys acting as an index for a redundant copy of the data item in the distributed database wherein the plurality of keys are generated based directly or indirectly on a first key acting as an index to the data item, the plurality of keys equal to a target redundancy level to be applied to said data item; wherein a metric indicative of a spacing between said plurality of keys is used to: generate said plurality of keys spaced apart by a value representing said metric, and cause different redundant copies of the data item to be stored on different ones of the plurality of data storage devices.

20. The apparatus of claim 19, wherein the plurality of keys are previously generated and stored by the apparatus or another apparatus, the apparatus further configured to obtain the plurality of keys using the processor in cooperation with one or both of the memory and the network interface.

* * * * *